C. N. SOWDEN.
PISTON PACKING.
APPLICATION FILED SEPT. 4, 1913.
1,097,563.
Patented May 19, 1914.
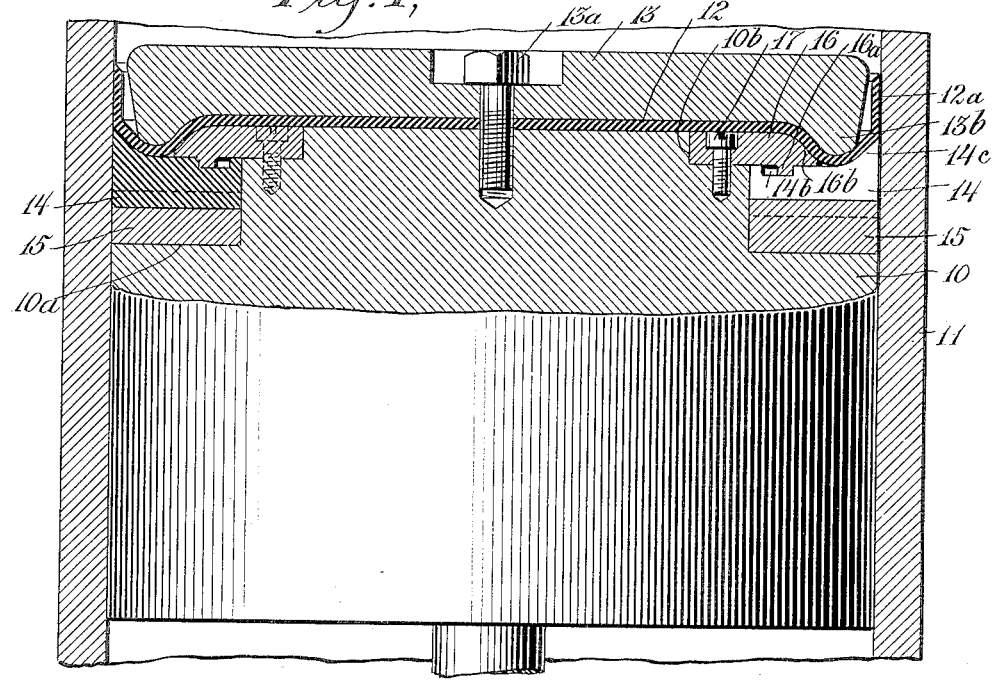
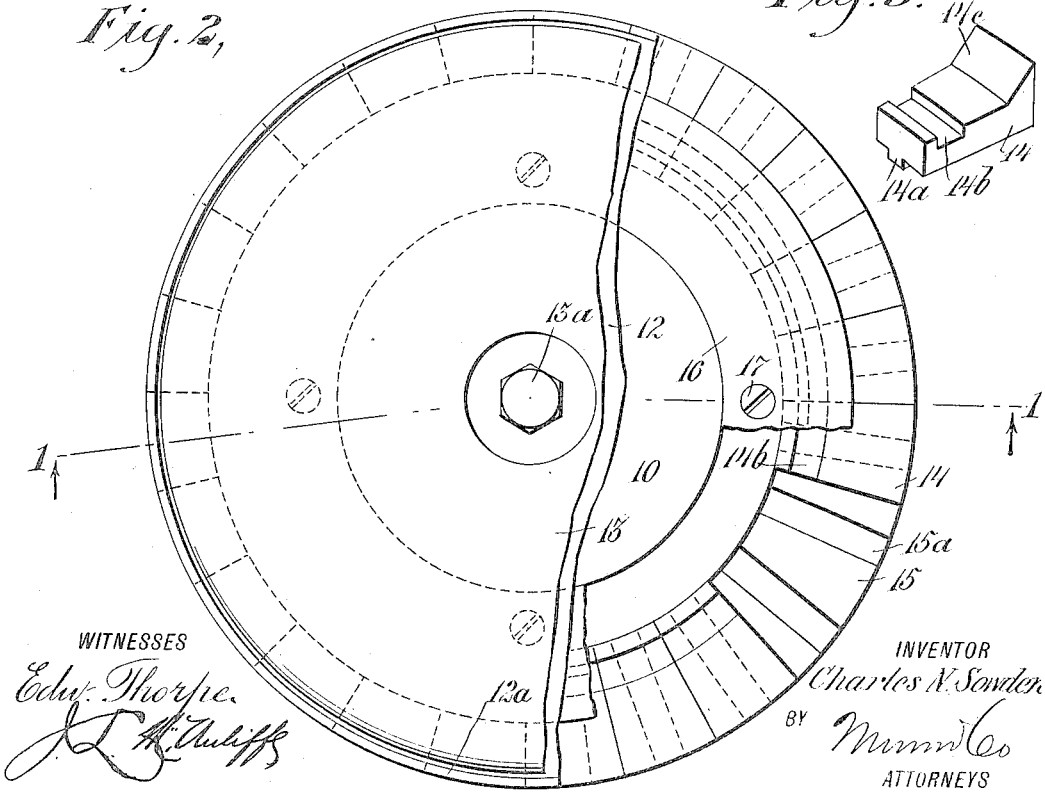
WITNESSES
Edw. Thorpe
INVENTOR
Charles N. Sowden
BY Munn & Co
ATTORNEYS

UNITED STATES PATENT OFFICE.

CHARLES N. SOWDEN, OF GUANTANAMO, CUBA.

PISTON-PACKING.

1,097,563.  Specification of Letters Patent.  Patented May 19, 1914.

Application filed September 4, 1913. Serial No. 788,086.

*To all whom it may concern:*

Be it known that I, CHARLES N. SOWDEN, a subject of the King of Great Britain, and a resident of Guantanamo, Santiago de Cuba Province, Cuba, have invented a new and Improved Piston-Packing, of which the following is a full, clear, and exact description.

My present invention is intended more particularly for embodiment in hydraulic pistons employing a cup packing, and it is a design of the invention to provide a novel means associated with the cup packing to prevent the latter from being forced between the piston and cylinder wall when either or both become worn.

The invention will be particularly explained in the specific description following.

Reference is to be had to the accompanying drawings forming a part of this specification, in which similar characters of reference indicate corresponding parts in all the views.

Figure 1 is a longitudinal transverse section through a cylinder and piston showing a practical embodiment of my invention; Fig. 2 is a front view of the piston, with parts broken away; and Fig. 3 is a perspective view of one of the sections of a ring employed beneath the cup packing.

The invention is illustrated in connection with a piston 10 operating in a cylinder 11. A flexible packing 12, of leather or equivalent material is clamped to the face of the piston by a clamp plate 13, secured by a bolt $13^a$ or the like. Extending around the piston in an annular groove in the face thereof, at the back, of the flexible packing is a sectional ring composed of radially separated sections 14, which are seated on a ring 15. On the under side of each section 14 is a radial rib $14^a$ which is received in a corresponding radial groove $15^a$ of the ring 15.

A clamp ring 16 is secured by screws 17 or the like to the face of the piston 10 beneath the flexible packing 12, and overlaps the inner ends of the ring sections 14, there being ribs $16^a$ on the ring 16 which are received in transverse grooves $14^b$ on the face of each section 14, said groove $14^b$ being curved and the grooves of the several sections alining to receive the rib $16^a$ of the clamp ring, said rib extending annularly.

Adjacent to the outer edge of the sectional ring each member 14 thereof is beveled on the forward face, as at $14^c$, presenting an outward and forward flare relatively to a radial line, the beveled surface or flare extending to the periphery of the ring, at an angle to the latter, thereby forming angular edge portions at the periphery of the said sectional ring. Similarly the adjacent surface of the clamp ring 16 has a reverse bevel $16^b$ extending therearound, so that an annular depression is formed between the beveled surfaces $14^c$ of the sectional ring and the beveled surface $16^b$ of the clamp ring. The clamp plate $13^b$ that secures the flexible packing has an annular rib on its inner face, at the periphery which is received in the depression formed by the surfaces $14^c$, $16^b$.

To receive the several detachable elements, the piston head is formed with an annular rabbet or recess $10^a$ in which the ring 15 is first seated, said recess accommodating also the sectional ring 14 in front of the ring 15. To receive the clamp ring 16, the face of the piston has a further annular depression $10^b$, of less radius than the depression $10^a$, and the clamp ring 16 will be received flush with the face of the piston so that the packing leather 12 is backed by the face of the piston, by the annular clamp ring 16, and will be backed adjacent to the wall of the cylinder 11 by the sectional ring formed by the elements 14. Owing to the bevels $14^c$, $16^b$, the annular rib $13^b$ of the clamp ring 13 will bend the packing material inwardly, and the pressure exerted on the packing ring, acting against the beveled surfaces $14^c$, will force the ring sections 14 outwardly against the cylinder wall, thereby preventing the cup packing from being forced between the piston and the wall of the cylinder. The clamp ring 13 is of sufficiently less diameter than the cylinder to receive the cupped outer edge $12^a$ of the packing between the said clamp ring and the cylinder.

Having thus described my invention, I claim as new, and desire to secure by Letters Patent:

1. In a piston, a cup packing, a clamp on the piston for said packing, and backing means for the cup of the packing, said means comprising a sectional ring composed of radially disposed sections, the forward surface of which at the edge is beveled to flare outwardly and forwardly forming with the outer cylindrical surface of the sectional ring angular edge members on said sections fitting at the back of the packing, outside of the cup thereof.

2. In a piston, a cup packing, a clamp on the piston for said packing, and backing means for the cup of the packing, said means comprising a sectional ring composed of radially disposed sections, the forward surface of which, at the edge, is beveled to flare outwardly and forwardly, forming with the outer cylindrical surface of the sections angular edge members fitting at the back of the packing, outside of the cut thereof, the clamp for the packing presenting a wedge member and the base of the cup packing being clamped between said wedge member and the angular members on the sectional ring.

3. In a piston, a cup packing, a sectional ring extending around the piston beneath the packing, near the edge thereof and composed of radially movable sections, a clamp ring beneath the packing and overlapping the sectional ring, at the inner side of the latter, said clamp ring and the sectional ring presenting opposite spaced beveled surfaces, and a packing clamp secured to the piston over the packing and having an annular wedge member on the inner face pressing the packing at the base of the cup against the mentioned beveled surfaces.

4. In a piston, a cup packing, a sectional ring extending beneath the cup of the packing and presenting a front surface flaring outwardly and forwardly at the outer portion forming a tapered, forwardly disposed annular edge, and means for pressing the cup of the piston outwardly against said tapered edge.

5. A piston having an annular depression in the face thereof, at the periphery, and a second annular depression in the face inward from the first depression, and complementary thereto, a seat ring in the first depression, a sectional ring on said seat ring, said seat ring having radial grooves and there being radial ribs on the members of the sectional ring movable in said grooves, a clamp ring in the second depression overlapping the sectional ring, the clamp ring having an annular rib and the sectional ring presenting an annular groove receiving the said rib and being of greater width radially to permit relative movement of the members of the sectional ring, and a clamp disk on the piston over the packing, the cup of the packing having its edge portion extending around the outside of the clamp disk, said disk having an annular wedge ring inward from the edge at the inner side, and the sectional ring and its clamp ring presenting opposed bevels between which the packing is pressed by the rib of the clamp disk.

6. In a piston, a cup packing, a sectional ring beneath the cup of the packing at the outer side of said cup, said sectional ring presenting a flaring surface, an element spaced radially inward from the flaring surface of the sectional ring and beveled oppositely thereto, and a packing clamp having a wedge ring on the under side corresponding with the space between the flare of the sectional ring and the bevel of the clamp ring.

In testimony whereof I have signed my name to this specification in the presence of two subscribing witnesses.

CHARLES N. SOWDEN.

Witnesses:
HERMANN ROTH,
CHESTER E. ABBOTT.